(12) United States Patent
Reed et al.

(10) Patent No.: US 7,728,551 B2
(45) Date of Patent: Jun. 1, 2010

(54) WIRELESS POWER TRANSFER SYSTEM

(75) Inventors: Daniel P. Reed, Warren, MI (US);
Theodore C. Wingrove, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 216 days.

(21) Appl. No.: 11/740,623

(22) Filed: Apr. 26, 2007

(65) Prior Publication Data

US 2008/0265835 A1 Oct. 30, 2008

(51) Int. Cl.
*H02J 7/00* (2006.01)
(52) U.S. Cl. ............... 320/108; 320/110; 320/114
(58) Field of Classification Search ........... 320/108, 320/110–115
See application file for complete search history.

(56) References Cited

U.S. PATENT DOCUMENTS

| | | | |
|---|---|---|---|
| 6,608,464 B1 * | 8/2003 | Lew et al. | 320/107 |
| 6,906,495 B2 | 6/2005 | Cheng et al. | |
| 7,042,196 B2 | 5/2006 | Ka-Lai et al. | |
| 7,271,569 B2 * | 9/2007 | Oglesbee | 320/108 |
| 2004/0145343 A1 * | 7/2004 | Naskali et al. | 320/108 |
| 2005/0007067 A1 | 1/2005 | Baarman et al. | |
| 2005/0116683 A1 | 6/2005 | Cheng et al. | |
| 2005/0135122 A1 | 6/2005 | Cheng et al. | |
| 2005/0189910 A1 * | 9/2005 | Hui | 320/108 |
| 2006/0061323 A1 | 3/2006 | Cheng et al. | |
| 2006/0061324 A1 | 3/2006 | Oglesbee | |
| 2006/0076922 A1 | 4/2006 | Cheng et al. | |
| 2006/0087282 A1 * | 4/2006 | Baarman et al. | 320/108 |
| 2007/0024238 A1 | 2/2007 | Nakade et al. | |
| 2007/0279002 A1 * | 12/2007 | Partovi | 320/115 |

\* cited by examiner

*Primary Examiner*—Edward Tso
*Assistant Examiner*—Ahmed Omar
(74) *Attorney, Agent, or Firm*—Dickinson Wright PLLC

(57) ABSTRACT

A wireless power transfer system 20 for charging an electronic device 22 having a secondary coil 24 includes a primary controller 38 disposed on a class B surface 30 of a vehicle. A primary coil 52 is electrically connected to the primary controller 38. The primary coil 52 is disposed remotely from the primary controller 38 on a class A surface 28 of the vehicle. A protective shield 66 is disposed on the primary coil 52 to secure the primary coil 52 to the class A surface 28 and indicia 68 indicating an alignment of the secondary coil 24 of the electronic device 22 is disposed on the protective shield 66.

22 Claims, 3 Drawing Sheets

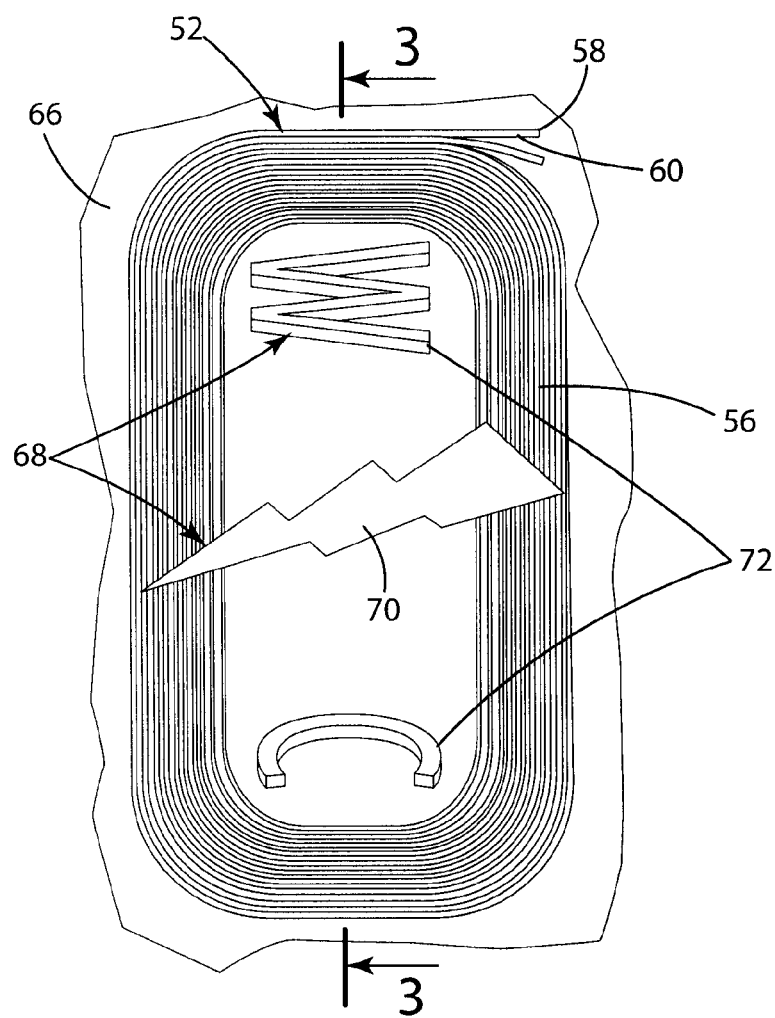
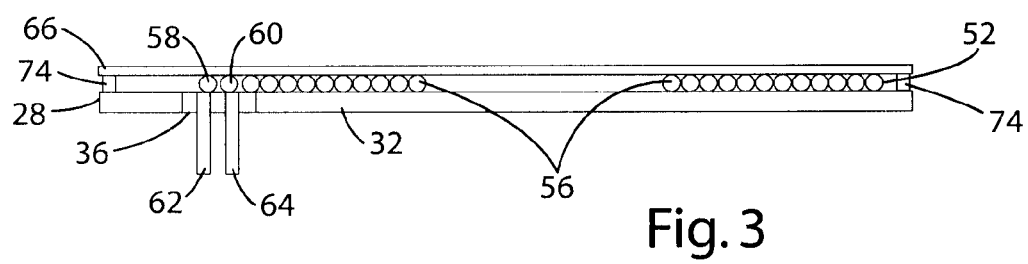
Fig. 3

WIRELESS POWER TRANSFER SYSTEM

BACKGROUND OF THE INVENTION

1. Field of the Invention

The subject invention relates to a wireless power transfer system for powering or charging an electronic device or a battery, and more specifically, to a wireless power transfer system for a vehicle having a controller and a remote primary coil for inductively charging a secondary coil in an electronic device.

2. Description of the Prior Art

Mobile or portable electronic devices are increasingly being used for communication, entertainment and time management. These mobile electronic devices, such as mobile phones, personal data assistants, music players, cameras, GPS units, and other audio/video or communication devices, are carried by users during the course of daily activities, and as such devices are powered by batteries, the users must continually monitor battery life and anticipate when the batteries need to be charged, so that the devices do not inconveniently become inoperable due to a low battery condition.

Charging portable electronic devices currently requires the use of a charging cord having a connector connected to a power source. It is difficult for users to anticipate when they will be near a power source for a sufficient time period to charge the battery within the device. In a vehicle, the power source is typically a charging outlet such as a cigarette lighter. If the user charges the device in a vehicle, the user connects a special charging cord to the power outlet and the device, Charging cords typically include a unique connector arrangement for each type of device or each manufacturer. For example, an electronic device such as a cell phone is not likely to have the same connector arrangement as a portable compact disc player and a cell phone by one manufacturer typically will not have the same connector arrangement as a cell phone by a different manufacturer.

One resolution to the cumbersome use of such charging cords has been the introduction of electromagnetic induction technology; however manufacturers of vehicles have been slow to adopt such technology. Induction technology is employed in a wide range of applications, such as power transfer interfaces for electric vehicles, recharging electric toothbrushes, and powering smart-tags and security tags. However, all these devices use very special units for the primary and secondary coils that provide specific interface and relative location arrangements. Due to the difficulty in arranging specific interfaces within a vehicle, the inventors are not aware of any inductive charging systems currently being used in production vehicles for powering or charging a device.

Electromagnetic induction technology includes the use of a primary controller connected to a power supply and a primary coil that generates an electromagnetic field when a current flows through the coil. A secondary coil is provided in a remote electronic device such that when the device is placed in proximity to the primary controller, the electromagnetic field generated by the coil induces a current in the secondary coil of the remote electronic device. As such, the power is transferred wirelessly between the primary controller and the remote electronic device without the need for cumbersome charging cords.

Wireless power transfer systems eliminate the need to have open electrical contacts; however, the electromagnetic fields generated by such systems are relatively small. For this reason, secondary devices must be placed accurately into an electromagnetic field such that the primary coil in the wireless charger and the secondary coil in the electronic device are in a predefined relative position. As a result, chargers are still only being primarily designed for a specific make and model of electronic device so that the coils may be properly aligned, such as a battery powered toothbrush that comes with its own charging holder. There remains a continual need for chargers which generate electromagnetic fields that induce stronger currents in the secondary coils of electronic devices and which also provide for positioning of the secondary coil of the electronic device in a predefined relative position.

SUMMARY OF THE INVENTION AND ADVANTAGES

The present invention provides for a wireless power transfer system for supplying power to an electronic device or battery having a secondary. The power transfer system generally includes a primary controller, a primary coil, and a protective shield. The primary coil is remote from and electrically connected to the primary controller to establish an electrical circuit for generating an electromagnetic field. The protective shield is coupled to the primary coil and is generally configured for securing the primary coil to the class A surface of a vehicle for allowing the electronic device having the secondary coil to be positioned proximate to the primary coil.

The present invention allows an electronic device having a secondary coil to be positioned proximate to the primary induction coil of the wireless power transfer system for efficient power transfer without exact positioning of the electronic device relative to the primary coil.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of a portion of the wireless power transfer system showing the primary coil;

FIG. 3 is a cross-sectional view of the primary coil shown in FIG. 2 along 3-3.

DETAILED DESCRIPTION OF THE INVENTION

Referring to the Figures, wherein like numerals indicate corresponding parts throughout the several views, a wireless power transfer system 20 is generally shown for charging an electronic device 22. The electronic device 22 includes a secondary coil 24 for receiving power from the power transfer system 20 and is shown as a cell phone, however, it should be appreciated that the present invention is designed for use with many other electronic devices 22 including, but not limited to, personal data assistants and portable music players.

Figure 1:
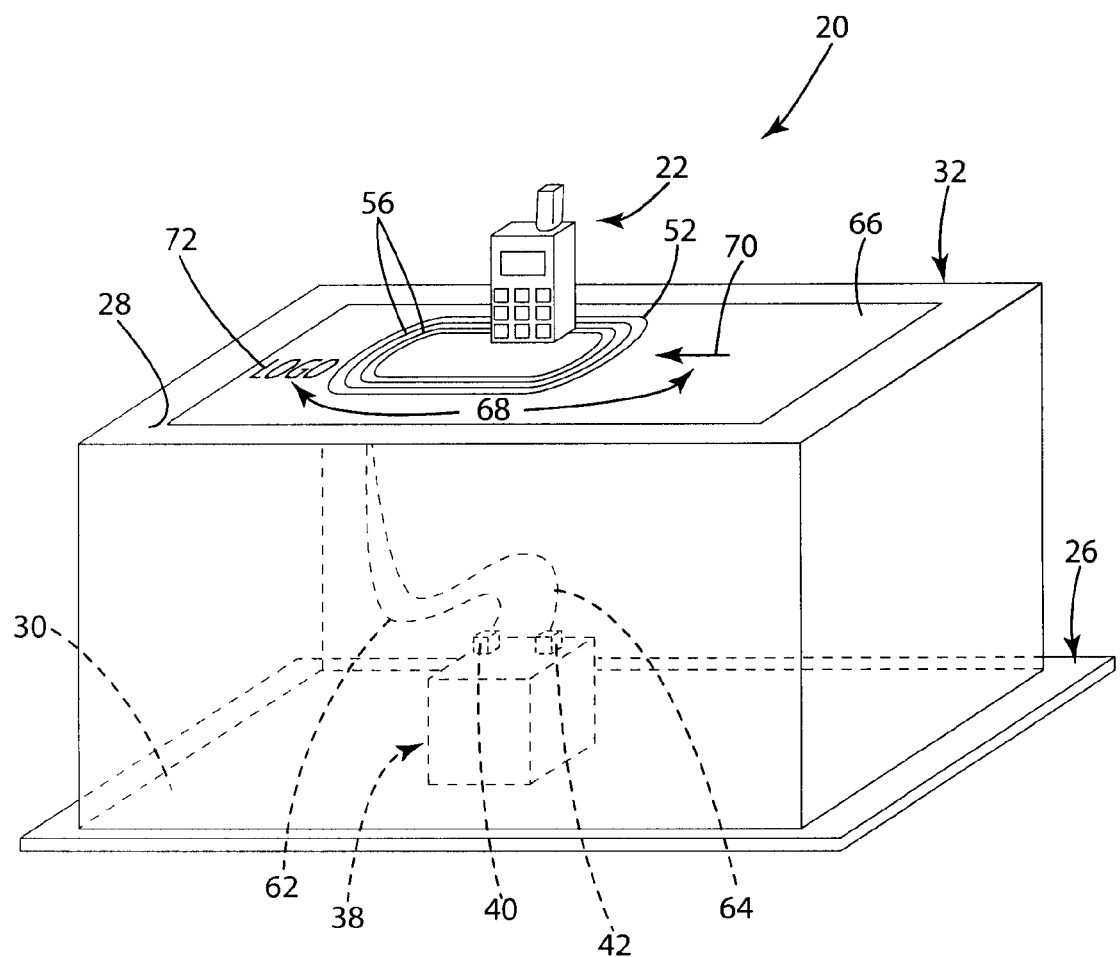
FIG. 1 is a perspective view of the wireless power transfer system.
Figure 4:
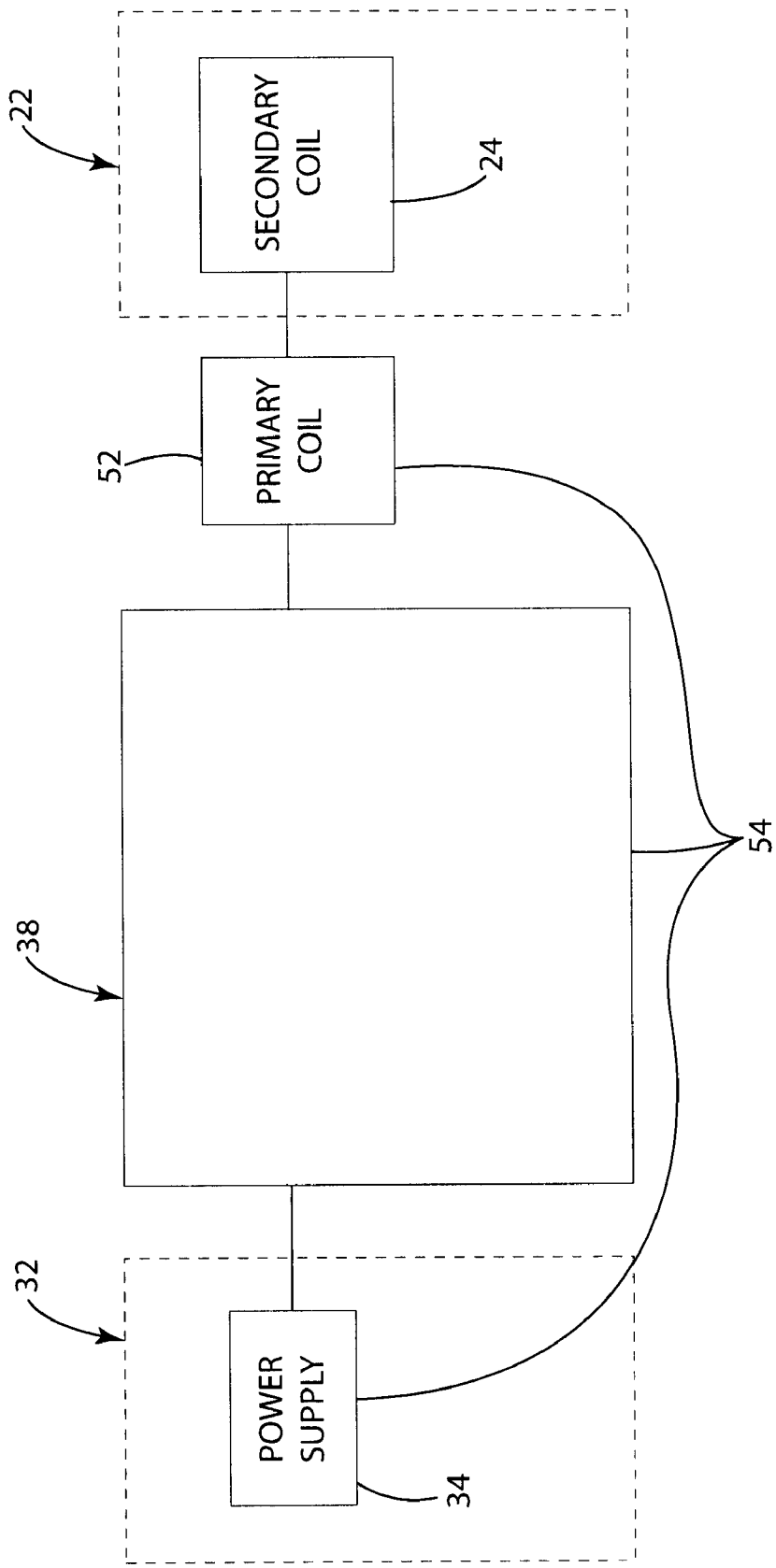
FIG. 4 is a block diagram of a wireless power transfer system with an electronic device having a secondary coil.

The wireless power transfer system 20 generally comprises a primary controller 38, a primary coil 52, a protective shield 66, and a support structure 26. The support structure 26 is generally indicated in FIG. 1 and has a class A surface 28. The class A surface 28 can be any surface which is visible or easily accessible to the user. The support structure may further include a class B surface, which is any surface not readily visible or accessible to the user, including the underside of a desk or behind a panel within a vehicle. In a preferred embodiment, the support system 20 is further defined as a vehicle having a class A surface 28, a class B surface 30, and a power supply 34. The class A surface 28 is preferably conveniently located within the vehicle and is typically in close proximity to a vehicle occupant. The class A surface 28 may be defined by a component 32, and the component 32 could be an arm rest, a side door stowage area, a cup holder, a glove compartment, the inside surface of the door of the glove compartment, a stowage area on the instrument panel a seat back, an overhead console, or any other accessible component within the vehicle. As an example, a stowage area on the instrument panel may be an area such as an area on the top surface of the instrument panel, a stowage area in the center stack of the instrument panel, such as by the radio, a stowage area near the steering column of the vehicle, and any other stowage area on the instrument panel that is easily reachable by the occupant of the vehicle. As shown in FIG. 3, the component 32 may have a through-hole 36 for presenting electrical leads to the class A surface 28. In the embodiment of the system 20 as shown in FIG. 1, the class A surface 28 is planar for contacting and supporting the electronic device 22 although other shapes and configurations of the class A surface 28 are acceptable. The class B surface 30 is any surface of the vehicle which is not visible to an occupant of the vehicle. For example, the class B surface may be underneath the instrument panel or dashboard of a vehicle or under the center counsel of the vehicle.

The primary controller 38, generally indicated, is remote from the primary coil 52 and is preferably disposed on the class B surface 30 of the vehicle. In alternative embodiments the primary controller is disposed remote from the primary coil 52 in any manner such that it is not coupled to the class A surface 28. The primary controller 38 is electrically connected to the power supply 34 of the vehicle and includes a positive network terminal 40 and a negative network terminal 42. The primary controller 38 may include any network of electrical components 32 generally known in the art for driving an inductor.

The primary coil 52 generally is a plurality of rings 56 and includes a positive coil terminal 58 and a negative coil terminal 60 for electrically connecting the primary coil 52 to the primary controller 38. The primary coil 52 is remote from and electrically connected to the primary controller 38 to establish an electrical circuit 54 for generating an electromagnetic field. The primary coil 52 is generally disposed on the class A surface 28 for allowing the electronic device 22 having the secondary coil 24 to be positioned proximate to the primary coil 52. The primary coil 52 can be adhesively bonded, insert molded, mechanically secured, or free floating on the class A surface 28. As shown in FIG. 2, the primary coil 52 is generally a plurality of rings 56. The plurality of rings 56 are preferably concentric and contiguous wherein each of the rings 56 abut the class A surface 28 of the support structure 26 as shown in FIG. 3. In the embodiment of the invention as shown in FIG. 1, the plurality of rings 56 are coplanar for conforming to the class A surface 28. In additional embodiments, the plurality of rings 56 are preferably flexible for conforming to the class A surface 28. The rings 56 may be elliptical for conforming to rectangular class A surfaces 28 or the rings 56 may be circular for conforming to circular or square shaped class A surfaces 28. The rings 56 may also be configured to any other shape to be aesthetically pleasing to the interior environment of the vehicle or to cover a surface area.

A positive lead 62 extends from the positive coil terminal 58 of the primary coil 52 to the positive network terminal 40 of the primary controller 38 to electrically connect the positive coil terminal 58 and the positive network terminal 40. A negative lead 64 extends from the negative coil terminal 60 of the primary coil 52 to the negative network terminal 42 of the primary controller 38 to electrically connect the negative coil terminal 60 and the negative network terminal 42 to establish the electrical circuit 54 including the power supply 34, the primary controller 38, and the primary coil 52 for generating the electromagnetic field. The leads 62, 64 preferably extend through the through-hole 36 of the component 32 to the primary coil 28. In an alternative embodiment, the primary coil terminals 58, 60 may extend through the through-hole of the component to connect to the leads 62, 64.

A protective shield 66 is coupled to the primary coil 52 for protecting the primary coil 52. The protective shield 66 is generally configured for securing the primary coil 52 to the class A surface 28. The protective shield 66 is preferably transparent for rendering the primary coil 52 visible to an occupant of the vehicle, however the protective shield 66 may also be opaque, or colored for an aesthetic purpose, such as to match the color of the surface on which it is situated, while providing alternative means of identifying the primary coil 52 such as, but not limited to, graphics, colors, or raised indications. The protective shield 66 is also preferably flexible for conforming to the class A surface 28. The protective shield 66 may enclose the primary coil 52 while still remaining flexible.

An adhesive 74 may be disposed on the protective shield 66 for adhering the protective shield 66 to the class A surface 28 to secure the primary coil 52 to the class A surface 28, although additional methods of securing the protective shield 66 to the class A surface 28 may also be employed. The adhesive 74 may be pressure sensitive, heat activated, or any other type of adhesive 74 commonly known in the art.

As shown in FIG. 1, indicia 68 may be disposed on the protective shield 66 for identifying the primary coil 52. The indicia 68 may include an alignment indicator 70 for indicating an alignment of the secondary coil 24 of the electronic device 22. The indicia 68 may also include a logo 72 for advertising an entity. The indicia 68 preferably adds to the interior styling theme of the environment in which it is placed.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A wireless power transfer system for a vehicle having a class A and class B surface, the wireless power system capable of transferring power to an electronic device having a secondary coil, the wireless power transfer system comprising:

a primary controller disposed on the class B surface of the vehicle;

a primary coil remote from and electrically connected to said primary controller to establish an electrical circuit for generating an electromagnetic field; and a protective shield coupled to and protecting said primary coil wherein said protective shield secures said primary coil to the class A surface of the vehicle, wherein the primary coil flexibly conforms to a shape of the class A surface, wherein said protective shield is transparent to render said primary coil visible through said protective shield, said protective shield is flexible, and said class A surface is a visible surface and said class B surface is not a visible surface.

2. A system as set forth in claim 1, wherein said protective shield is capable of conforming to the class A surface of the vehicle.

3. A system as set forth in claim 1, wherein said system includes a component defining the class A surface of the vehicle.

4. A system as set forth in claim 3 wherein said component comprises at least one of a center counsel, an armrest, a side door stowage area, a stowage area on the instrument panel, a cup holder, a glove compartment, a seat back, and an overhead console.

5. A system as set forth in claim 1 including an adhesive disposed on said protective shield for adhering said protective shield to the class A surface of the vehicle.

6. A system as set forth in claim 5 wherein said adhesive is pressure sensitive.

7. A system as set forth in claim 5 wherein said adhesive is heat activated.

8. A system as set forth in claim 1 wherein said primary coil is a plurality of rings with each of said rings abutting said protective shield.

9. A system as set forth in claim 8 wherein said rings and said protective shield are flexible.

10. A system as set forth in claim 8 wherein said rings are concentric.

11. A system as set forth in claim 8 wherein said rings are contiguous.

12. A system as set forth in claim 8 wherein said rings are coplanar.

13. A system as set forth in claim 1 including indicia disposed on said protective shield for identifying said primary coil.

14. A system as set forth in claim 13 wherein said indicia includes an alignment indicator for indicating an alignment of the secondary coil of the electronic device.

15. A system as set forth in claim 13 wherein said indicia includes a logo for advertising an entity.

16. A wireless power transfer system for transferring power to an electronic device having a secondary coil comprising:
a support structure having a class A surface;
a primary controller disposed on a class B surface and remote from said class A surface of said support structure wherein said primary controller is not coupled to said class A surface of said support structure;
a protective shield coupled to said class A surface; and
a primary coil disposed between said protective shield and said class A surface, said protective shield protecting said primary coil, said primary coil being electrically connected to and remote from said primary controller, said primary coil and primary controller generating an electromagnetic field, and wherein the location of said primary coil is visible for allowing the electronic device having the secondary coil to be positioned proximate to said primary coil, and the primary coil flexibly conforms to a shape of the class A surface,
wherein said primary coil and said protective shield are flexible, said protective shield is transparent to render said primary coil visible on said class A surface of said support structure, and said class A surface is a visible surface and said class B surface is not a visible surface.

17. A system as set forth in claim 16 wherein said primary coil is a plurality of rings with each of said rings abutting said class A surface of said support structure.

18. A system as set forth in claim 17 wherein said class A surface has a profile and wherein said rings follow said profile.

19. A system as set forth in claim 16 including an adhesive disposed on said protective shield for adhering said protective shield to said class A surface of said support structure to secure said primary coil to said class A surface of said support structure.

20. A system as set forth in claim 16 including indicia disposed on said protective shield for identifying said primary coil.

21. A system as set forth in claim 20 wherein said indicia includes an alignment indicator for indicating an alignment of the secondary coil of the electronic device.

22. A wireless power transfer system for transferring power to an electronic device having a secondary coil comprising:
a support structure being a vehicle and having a class A surface and a class B surface;
a primary coil being a plurality tings disposed on said class A surface of said vehicle for allowing the electronic device having the secondary coil to be positioned proximate to said primary coil;
a primary controller disposed on said class B surface of said vehicle remote from said class A surface wherein said primary controller is electrically connected to said primary coil; and
a protective shield being transparent and flexibly coupled to said primary coil for protecting said primary coil and securing said primary coil to the class A surface of the vehicle, wherein the primary coil flexibly conforms to a shape of the class A surface, and said class A surface is a visible surface and said class B surface is not a visible surface.

\* \* \* \* \*